United States Patent
Bargauan

(10) Patent No.: US 7,924,886 B2
(45) Date of Patent: Apr. 12, 2011

(54) DETERMINISTIC PROGRAM CLOCK REFERENCE RE-STAMPING FOR SYNCHRONOUS BIT RATE ADAPTATION BASED ON MEGA-FRAME INITIALIZATION PACKET

(75) Inventor: Michele Bargauan, Novate Milanese (IT)

(73) Assignee: Screen Service Broadcasting Technologies S.p.A. (IT)

( * ) Notice: Subject to any disclaimer, the term of this patent is extended or adjusted under 35 U.S.C. 154(b) by 59 days.

(21) Appl. No.: 12/139,886

(22) Filed: Jun. 16, 2008

(65) Prior Publication Data

US 2008/0310460 A1    Dec. 18, 2008

Related U.S. Application Data

(60) Provisional application No. 60/929,169, filed on Jun. 15, 2007, provisional application No. 60/929,170, filed on Jun. 15, 2007.

(51) Int. Cl.
*H04J 3/06* (2006.01)
(52) U.S. Cl. .................................. 370/503; 370/545
(58) Field of Classification Search ............ 370/235, 370/512
See application file for complete search history.

(56) References Cited

U.S. PATENT DOCUMENTS

| | | | |
|---|---|---|---|
| 2001/0024456 A1* | 9/2001 | Zaun et al. ............. | 370/535 |
| 2002/0006171 A1* | 1/2002 | Nielsen ................... | 375/316 |
| 2005/0169181 A1* | 8/2005 | Kim et al. ............... | 370/235 |
| 2005/0190872 A1 | 9/2005 | Seong et al. | |
| 2007/0286245 A1 | 12/2007 | Yamada | |
| 2009/0122200 A1* | 5/2009 | Tatsumi .................. | 348/723 |

FOREIGN PATENT DOCUMENTS

| | | |
|---|---|---|
| EP | 1 083 688 | 3/2001 |
| EP | 1 175 008 | 1/2002 |
| EP | 1 503 592 | 2/2005 |
| EP | 1 768 285 | 3/2007 |
| WO | WO 2006/084361 | 8/2006 |

OTHER PUBLICATIONS

"Digital Video Broadcasting (DVB): DVB mega-frame for Single Frequency Network (SFN) synchronication; ETSI TS 101 191" ETSI Standards, LIS, Sophia Antipolis Cedex, France, vol. BC, No. V1.4.1, Jun. 2004.

"Digital Video Braodcasting (DVB); Framing structure, channel coding and modulation for digital terrestrial television" ETSI EN 300 744, V1.4.1, Jan. 2001.

"Digital Video Broadcasting (DVB); Implementation Guidelines for DVB terrestrial services; Transmission aspects" TR 101 190, V1.1.1, Dec. 1997, pp. 1-77.

* cited by examiner

*Primary Examiner* — Huy D Vu
*Assistant Examiner* — Maria Sekul
(74) *Attorney, Agent, or Firm* — Andrew Bodendorf

(57) ABSTRACT

A system and processes create a transport stream carrying several encapsulated contents, watermarks, and other ancillary data. The transport stream is re-multiplexed while keeping synchronous and deterministic operation. Synchronous deterministic operation allow each derived transport stream to be broadcasted in Single Frequency Networks, as all re-multiplexers have the same signal at the input and selecting the same content generates exactly the same stream in multiple locations.

6 Claims, 1 Drawing Sheet ated international standards. The systems and method described herein are also applicable in any other system that requires bit rate adaptation with PCR re-stamping and delivers a deterministic and identical bit stream at all participating equipment.

DETERMINISTIC PROGRAM CLOCK REFERENCE RE-STAMPING FOR SYNCHRONOUS BIT RATE ADAPTATION BASED ON MEGA-FRAME INITIALIZATION PACKET

CROSS-REFERENCE TO RELATED APPLICATIONS

This application claims the benefit under 35 U.S.C. §119(e) of U.S. Provisional Application No. 60/929,169 titled "Deterministic Program Clock Reference Re-stamping for Synchronous Bit Rate Adaptation based on Mega-frame Initialization Packet" filed on Jun. 15, 2007 in the U.S. Patent and Trademark Office, and of U.S. Provisional Application No. 60/929,170 titled "Mega-frame Initialization Packet Generation and Synchronous Re-generation with Bit Rate Adaptation for Single Frequency Networks with Multiple Modulation Schemes" filed on Jun. 15, 2007 in the U.S. Patent and Trademark Office, of which the entire disclosures of both applications are herein incorporated by reference in their entirety for all purposes.

TECHNICAL FIELD

The following description relates generally to a system useful in Single Frequency Networks, and in particular to a system useful in Single Frequency Networks for DVB-T/H complying with European Telecommunications Standards Institute (ETSI) EN 300 744 and ETS 101 191, and related international standards. The systems and method described herein are also applicable in any other system that requires bit rate adaptation with PCR re-stamping and delivers a deterministic and identical bit stream at all participating equipment.

BACKGROUND

European Telecommunications Standards Institute—European Standard ETSI EN 300 744 describes a broadcasting system for terrestrial distribution based on Orthogonal Frequency-Division Multiplexing COFDM (a digital multi-carrier modulation scheme that uses a large number of closely-spaced orthogonal subcarriers) and MPEG2 (encoding and transport data system, for example, as defined by ISO/IEC 13818-1.MPEG) technologies. Application of the European Telecommunications Standards Institute—Technical Specification ETSI ETS 101 191 extend the user of this system to Single Frequency Networks (SFN), for example, as defined by ETS 101 191 and in Advanced Television Systems Committee (ATSC) A110.

The extension to SFN is accomplished by periodically adding one packet including synchronization time stamps and modulation parameters information to the transport stream (e.g., as defined by ISO 138181-1) of all transmitters broadcasting in a SFN area. The packet that is added to the transport stream is a Mega-frame Initialization Packet (MIP). The MIP is an MPEG2 transport stream compliant packet that carries mega-frame and modulation parameters, for example, as defined by ETS 101 191.

SUMMARY

In one general aspect, a method of providing a fixed and deterministic bit rate adaptation for an output transport stream is described below. The method includes receiving an input transport stream of packets; deriving output timing from the input transport stream; determining an input time stamp for each packet of the input transport stream; determining a corresponding output timestamp for each outgoing packet of the output transport stream; determining the difference between the input timestamp and the output timestamp; extracting a program clock reference (PCR) for the output transport stream; adding the determined difference to the PCR; and adding the PCR to the output transport stream.

The method also may includes receiving the input stream of packets includes a time mark packet; determining a period from the time mark; determining the input time stamp and output time stamp for each packet within the period; and resetting the timestamps at the end of each period.

The time mark may be a mega-frame initialization packet (MIP) and the period is a mega-frame. The time mark also may be a mega-frame initialization packet (MIP) and the period is an extra long mega-frame.

The method may further include the output transport stream from the input transport stream packets by inserting or eliminating null packets to perform rate adaptation based on the output timing.

The time base sampling frequency may be 34,292,160 MHz for a reference clock of 27 MHz and the difference is divided by 1,270,080.

The time base sampling frequency may be 5,670 MHz for a reference clock of 8 MHz and the difference is divided by 210.

In another general aspect, a system for providing a fixed and deterministic bit rate adaptation for an output transport stream is described below. The system may include an input to receive an input transport stream of packets; a timer to provide output timing derived from the input transport stream; a counter to determine an input time stamp for each packet of the input transport stream; a counter to determine a corresponding output timestamp for each outgoing packet of the output transport stream; a processor to determine the difference between the input timestamp and the output timestamp, extract a program clock reference (PCR) for the output transport stream; add the determined difference to the PCR; and add the PCR to the output transport stream; and an output to output the transport stream according to the derived output timing.

The input stream may include a time mark packet used to determine a period, the input time stamp and output time stamp are determined for each packet within the period; and the timestamps are reset at the end of each period. The time mark may be a mega-frame initialization packet (MIP) and the period is a mega-frame. The time mark also may be a mega-frame initialization packet (MIP) and the period is an extra long mega-frame.

The system also may include a composer to create the output transport stream from the input transport stream packets by inserting or eliminating null packets to perform rate adaptation based on the output timing.

The time base sampling frequency may be 34,292,160 MHz for a reference clock of 27 MHz and the difference is divided by 1,270,080. The time base sampling frequency also may be 5,670 MHz for a reference clock of 8 MHz and the difference is divided by 210. Other features will be apparent from the detailed description, drawings, and claims.

DETAILED DESCRIPTION

Figure 1:
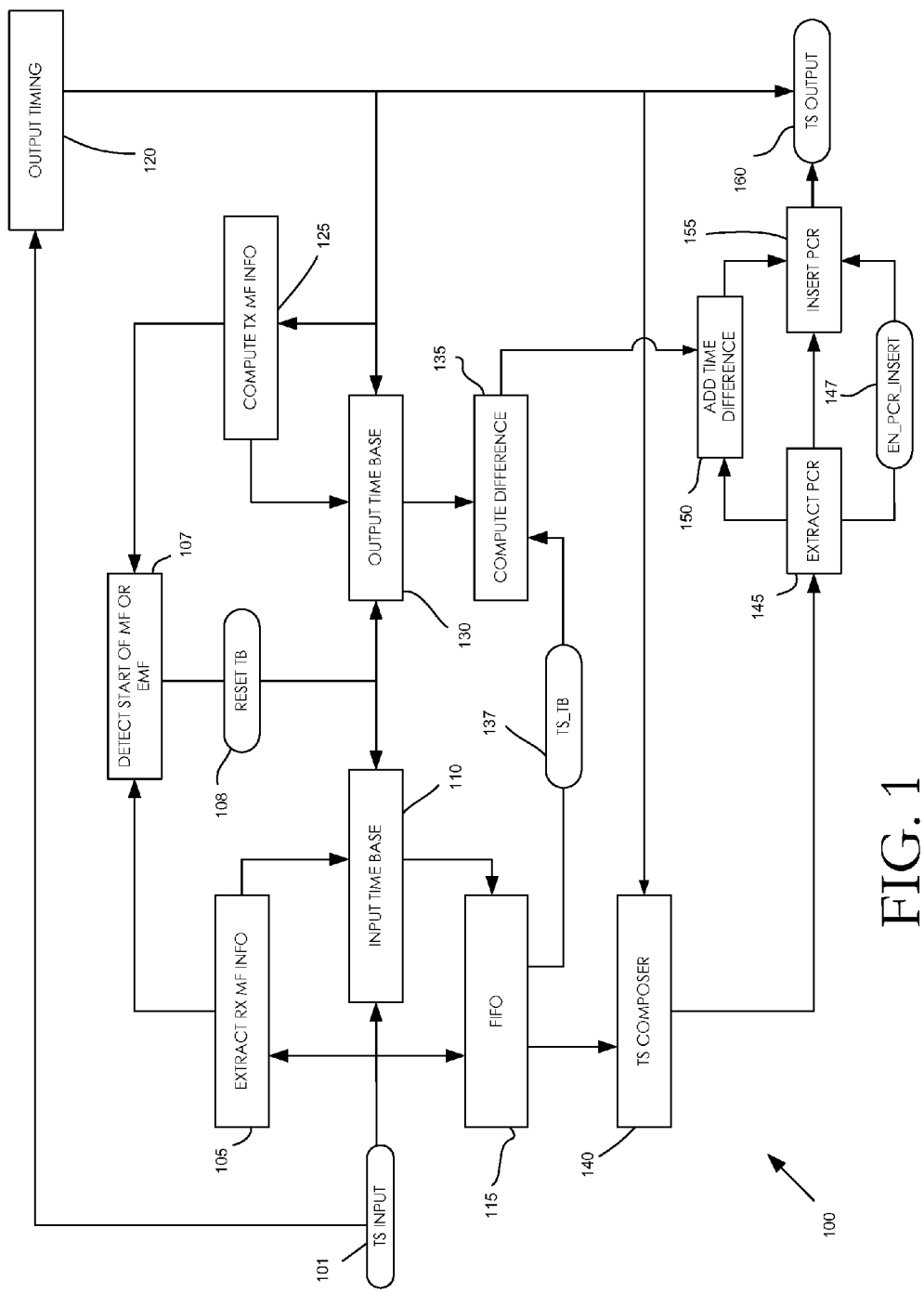
FIG. 1 is an exemplary block diagram of a system for single frequency networks.

Transport streams suitable for DVB SFN systems are defined by ETSI standard. The standard defines a bit rate and a synchronization packet (MIP) for each set of four parameters: channel Band Width (BW), Guard Time interval (GT), Constellation (CON), and Forward Error Correction ratio (FEC). The SFN transport stream must be the same (i.e., all bits in the stream must be equal bit after bit) at all transmitters broadcasting in an SFN area. However, some examples where the parameters require changing are as follows:

receiving an 8 MHz BW incoming signal which must be broadcast to an area where a 7 MHz channel is required (e.g., often the case in Italy and Germany where channels have mixed BW);

receiving an ¼ GT+x/xFEC incoming signal (e.g., where ¼ GT is used in a main transmitter for optimum SFN performance) which must be broadcast to an area where a smaller GT (e.g., ¹⁄₃₂ GT, used in small area coverage) may be used and a more robust y/yFEC provides increased signal protection for a lower power transmitter; and receiving a ¹⁄₃₂ GT+x/xFEC incoming signal (e.g., ¹⁄₃₂ GT is used in main transmitter where SFN operation is not required) which must be broadcast to SFN mode where an improved GT (e.g., ⅛ GT, used in medium area SFN coverage) may be used and a less robust y/yFEC provides a similar payload.

In these examples, when the transport stream changes from one set of parameters to another, the change in the transport stream bit rate, MIP, and PCR information must be determined. In a conventional system, the change in bit rate is made in a random way by inserting or subtracting null packets from an incoming transport stream and inserting a new MIP packet in a new random position. However, this random process does not guarantee that the bit stream at two different locations will be exactly the same in each bit (i.e., bit exact). In addition, the PCR re-stamping is typically made by modifying PCR information based on time-of-arrival and time-of-departure difference of transport stream packets. However, within the network there may be small differences due to jitter and equipment delays. Even the time-of-arrival itself is not a finite quantity. Furthermore, these small differences in PCR correction values are normally made between different locations. As a result, different systems are not able to generate the same bit sequence. The following description provides a process and system for determining PCR re-stamping that produces a bit stream that is bit exact at any participating system, even in two different locations.

FIG. 1 shows an example 100 of a basic block diagram of a system 100 for deterministic program clock reference re-stamping for synchronous bit rate adaptation using an MIP. The input signal may be any a transport stream 101, for example, as provided for in the ISO/IEC 13818-1 standard. The transport stream may include packets grouped into a mega-frame, which is a group of an integer number of TS packets, for example, as specified by ETS-101 191. The transport stream 101 is supplied to detector 105, time stamp generator 110, and memory 115.

The detector 105 processes the transport stream 101 to extract received mega frame information, such as the MIP parameters and related transport stream parameters, mega frame time boundaries, and, when available, extra-long mega frame time boundaries of the received transport stream. The detector 105 provides the received time frame boundaries to detector 107.

The time stamp generator 110 computes input time stamps or an input time base for each incoming packet of the transport stream. The time base count is incremented linearly at every input packet. The count is reset by the signal Reset TB 108 provided every time at the end of a Mega Frame or of an Extra-Long Mega Frame.

The memory 115 stores each input transport stream packet with a related time stamp computed by the time stamp generator 110. In one example, the memory may be implemented using a First In-First Out (FIFO) memory, where the first data written in are the first data read.

The transport stream also is provided to output timing generator 120. The output timing generator 120 generates an output timing signal based on the input transport stream bit rate. Since input and output transport streams are linked by a fixed ratio, all pulses and timing signals required to build the output transport stream are derived from the input transport stream bit rate, as is known to those skilled in the art.

Processing block 125 computes the transmit mega-frame information for the outgoing transport stream, such as the mega frame time boundaries, and, when available, extra-long mega frame time boundaries. The transmit time frame boundaries are provided to detector 107.

The Detector 107 detects the end/start of each mega frame in the transport steam, or, in the case that the input and the output mega frame do not have the same length, detects the end of an extra-long mega frame. When the detector 107 detects the end of a mega frame or extra-long mega frame, the detector generates the signal reset TB 108.

The output time stamp generator 130 computes the output time stamps or time base for each outgoing packet. The output time base count is incremented linearly at every output packet. The base count is reset by the signal reset TB 108 provided at the end of every mega frame or extra-long mega frame.

Block 135 determines the difference between the output time stamp provided by generator 130 and the input time stamp TS_TB 137 computed by the input time stamp generator 110 that is stored with each associated packet in the FIFO memory 115. The received packets are output from the FIFO memory 115 to the transport stream composer 140. The transport stream composer 140 is provided with the output timing and performs bit rate adaptation of the transport stream by determining whether to eliminate or insert null packets in the transport stream. The transport stream is provided to the extractor 145.

Extractor 145 detects if any of the packets of the transport stream have an adaptation field with a PCR. If a PCR is detected, the extractor 145 extracts the PCR and sets a flag EN_PCR_INSERT 147. Any extracted PCR is provided to adder 150 which adds the time difference generated by block 135 to the extracted PCR to provide the recalibrated PCR. Inserter 155 re-inserts any recalibrated PCR into the transport stream when EN_PCR_INSERT flag is set. The adapted transport stream is delivered to output connector TS OUTPUT 160.

According to the systems and methods described herein, the input and output transport streams have a fixed and deterministic bit rate, even if ruled by a fractional ratio, and an input transport stream carries a time mark, such as the MIP packet, which may be used to identify a time period. The time period allows determination of a periodical starting point common to input and output transport streams by indicating where to reset the PCR adaptation process. To have comparable exact input and output time stamps at any possible input and output transport stream rate identified in EN 300 744, the time base sampling frequency of 34,292,160 MHz may be used as a virtual reference clock.

Table 1 shows a packets period expressed in cycles of time base sampling frequency for every combination of guard time (e.g. as defined by EN 300 744), constellation, Forward Error Correction (FER) in an 8 MHz channel. It may be noted that all values are integers and exact.

TABLE 1

|  | $1/4$ | $1/8$ | $1/16$ | $1/32$ |
|---|---|---|---|---|
| QPSK |  |  |  |  |
| $1/2$ | 10363852800 | 9327467520 | 8809274880 | 8550178560 |
| $2/3$ | 7772889600 | 6995600640 | 6606956160 | 6412633920 |
| $3/4$ | 6909235200 | 6218311680 | 5872849920 | 5700119040 |
| $5/6$ | 6218311680 | 5596480512 | 5285564928 | 5130107136 |
| $7/8$ | 5922201600 | 5329981440 | 5033871360 | 4885816320 |
| 16 QAM |  |  |  |  |
| $1/2$ | 5181926400 | 4663733760 | 4404637440 | 4275089280 |
| $2/3$ | 3886444800 | 3497800320 | 3303478080 | 3206316960 |
| $3/4$ | 3454617600 | 3109155840 | 2936424960 | 2850059520 |
| $5/6$ | 3109155840 | 2798240256 | 2642782464 | 2565053568 |
| $7/8$ | 2961100800 | 2664990720 | 2516935680 | 2442908160 |
| 64 QAM |  |  |  |  |
| $1/2$ | 3454617600 | 3109155840 | 2936424960 | 2850059520 |
| $2/3$ | 2590963200 | 2331866880 | 2202318720 | 2137544640 |
| $3/4$ | 2303078400 | 2072770560 | 1957616640 | 1900039680 |
| $5/6$ | 2072770560 | 1865493504 | 1761854976 | 1710035712 |
| $7/8$ | 1974067200 | 1776660480 | 1677957120 | 1628605440 |

Stamping with an exact value each input or output packet inside the reference period, the period of one Mega Frame or one Extra-Long Mega Frame allows the difference between the arrival time and the departure time of the transport stream to be determined. In addition, the computation is independent of any eventual jitter found in an incoming transport stream.

MPEG2 systems are based on an MPEG reference clock (a reference clock is used by transport stream system target decoder, for example, as defined by ISO/IEC 13818-1). The MPEG reference clock has a frequency of 27 MHz. To express a computed delay in the number of the reference clock, the difference is divided by 1,270,080, which is the ratio between the time base reference clock and the MPEG reference Clock. Addition of the computed time difference to the PCR value is performed using dual modulus arithmetic, as described in IS013818-1. The time base sampling frequency is only one example, and that many others may be computed according to the teachings herein.

For example, much lower frequencies my be found if only a subset of possible combinations is required like that shown in Table 2, which is base on the time base sampling frequency of 5,670 MHz. In this example, the flexibility is reduced compared to that of the first value, but for applications dealing with channel bandwidth of only 8 MHz it is sufficient. For this table and time base sampling frequency, the computed delay difference is divided by 210 to get the value added to the PCR.

TABLE 2

|  | $1/4$ | $1/8$ | $1/16$ | $1/32$ |
|---|---|---|---|---|
| QPSK |  |  |  |  |
| $1/2$ | 1713600 | 1542240 | 1456560 | 1413720 |
| $2/3$ | 1285200 | 1156680 | 1092420 | 1060290 |
| $3/4$ | 1142400 | 1028160 | 971040 | 942480 |
| $5/6$ | 1028160 | 925344 | 873936 | 848232 |
| $7/8$ | 979200 | 881280 | 832320 | 807840 |
| 16 QAM |  |  |  |  |
| $1/2$ | 856800 | 771120 | 728280 | 706860 |
| $2/3$ | 642600 | 578340 | 546210 | 530145 |
| $3/4$ | 571200 | 514080 | 485520 | 471240 |

TABLE 2-continued

|  | $1/4$ | $1/8$ | $1/16$ | $1/32$ |
|---|---|---|---|---|
| $5/6$ | 514080 | 462672 | 436968 | 424116 |
| $7/8$ | 489600 | 440640 | 416160 | 403920 |
| 64 QAM |  |  |  |  |
| $1/2$ | 571200 | 514080 | 485520 | 471240 |
| $2/3$ | 428400 | 385560 | 364140 | 353430 |
| $3/4$ | 380800 | 342720 | 323680 | 314160 |
| $5/6$ | 342720 | 308448 | 291312 | 282744 |
| $7/8$ | 326400 | 293760 | 277440 | 269280 |

This process gives examples of a way to implement a deterministic program clock reference re-stamping in Digital Video Broadcasting for Handheld Mobile/Terrestrial Television DVB-T/H (e.g., as defined in EN 300 744 and in TR102 377DVB-T/H) systems where mega-frame initialization packet or extra-long mega frame watermarking is present. The processes described above guarantee that any equipment having the same signal at the input and having the same output bit rate, and generates exactly the same stream (bit exact) in multiple locations. As a result, the system and methods described herein allow the use of the embedded Mega-frame Initialization Packet to achieve a high precision and deterministic PCR re-stamping that can be applied at the input of each transmitter of an SFN network, thereby maintaining the SFN requirements of identical bit stream at every transmitter and being fully compliant with above-mentioned standards.

A number of exemplary implementations have been described. Nevertheless, it will be understood that various modifications may be made. For example, suitable results may be achieved if the steps of described techniques are performed in a different order and/or if components in a described components, architecture, or devices are combined in a different manner and/or replaced or supplemented by other components. Accordingly, other implementations are within the scope of the following claims.

What is claimed is:

1. A method of program clock reference (PCR) adaptation for an output transport stream, the method comprising:
   receiving an input transport stream of packets;
   extracting a time mark packet from the packets in the input transport stream;
   determining a time period from the time mark;
   computing an input time base count for a first packet of the input transport stream within the time period and an output time base count for a first packet of the output transport stream determined from the time mark;
   linearly incrementing the input time base count for each additional packet of the input transport stream within the time period and linearly incrementing the output time base count for each packet of the output transport stream;
   determining the difference between the input time base count and the output time base count corresponding to a packet in the output stream including a PCR; and
   adapting the PCR for the packet in the output transport stream including the PCR by adjusting the PCR for the determined difference.

2. The method of claim 1 wherein the time mark is a mega-frame initialization packet (MIP) and the time period is one of a mega-frame or an extra long mega-frame.

3. The method of claim 1 further comprising:
   deriving output timing from the input transport stream bit rate;

composing the output transport stream from the input transport stream packets by inserting or eliminating null packets to perform bit rate adaptation based on the derived output timing.

4. The method of claim 1 wherein a time base sampling frequency is 34,292,160 MHz for a reference clock of 27 MHz and the determined difference is divided by 1,270,080.

5. The method of claim 1 wherein the time base sampling frequency is 5,670 MHz for a reference clock of 8 MHz and the determined difference is divided by 210.

6. The method of claim 1 further comprising:
deriving output timing from the input transport stream bit rate;
composing the output transport stream from the input transport stream packets by inserting or eliminating null packets to perform bit rate adaptation based on the derived output timing, wherein computing an output time base count and linearly incrementing the output time base count is based on the derived output timing.

* * * * *